United States Patent [19]
Pellman

[11] 3,793,903
[45] Feb. 26, 1974

[54] MECHANISM FOR SEAT ADJUSTMENT

[75] Inventor: Ronald C. Pellman, Trumbull, Conn.

[73] Assignee: American Standard Products, Inc., Hartford, Conn.

[22] Filed: June 13, 1972

[21] Appl. No.: 262,372

[52] U.S. Cl............... 74/531, 297/375, 188/67, 188/82.3, 188/82.84
[51] Int. Cl........ A47c 1/02, B60m 1/06, G05g 5/22
[58] Field of Search...... 74/531; 188/67, 82.3, 82.8, 188/82.84; 297/375

[56] References Cited
UNITED STATES PATENTS

| | | | |
|---|---|---|---|
| 2,037,261 | 4/1936 | Nenninger | 74/531 X |
| 2,341,465 | 2/1944 | Monnot | 188/67 |
| 2,595,240 | 5/1952 | Glick et al. | 297/375 |
| 688,088 | 12/1901 | Holtz | 297/375 |
| 722,439 | 3/1903 | Wilsdorf | 297/375 |
| 980,049 | 12/1910 | Beyer | 297/375 |
| 3,419,306 | 12/1968 | Homier et al. | 297/375 |

FOREIGN PATENTS OR APPLICATIONS

| 268,840 | 1/1914 | Germany | 297/375 |
|---|---|---|---|

*Primary Examiner*—Allan D. Herrmann
*Attorney, Agent, or Firm*—Irvin A. Lavine

[57] ABSTRACT

A mechanism for controlling the positioning and motion of two relatively movable parts, such as a pivoted chair back and a chair seat for aircraft, busses, etc., comprising a slide bar having a lock device for holding it in any adjusted position, the lock device being releasable by a manually actuated control. The lock device includes a one-way override, which enables the slide bar to be moved in response to a force applied by its connection to a seat back when the seat is urged towards upright position. A spring acts on the slide bar to move it and the seat to seat-upright position, and a pneumatic cylinder is connected to the slide bar to control its velocity, to avoid slapping the back of the seat's occupant by the seat back upon actuation of the control for the lock device. Adjustable limit stops are provided to determine the range of movement of the slide bar, and hence of the seat back. The mechanism is entirely mechanical, except for the noted pneumatic cylinder.

33 Claims, 8 Drawing Figures

PATENTED FEB 26 1974 3,793,903

MECHANISM FOR SEAT ADJUSTMENT

BACKGROUND OF THE INVENTION

The present invention relates to a mechanism permitting the positioning of two parts relative to each other, such as in connection with recliner-type seating as used in aircraft, buses, and the like.

In a number of applications, a mechanism is desirable for releasably holding two parts relative to each other in a number of different adjusted positions, and this is true in particular in the field of recliner seats, wherein the seat back is pivotally connected to the seat bottom. More particularly, in the seating provided in aircraft and busses, the pivoting of the seat back to the seat bottom is preferably of the type allowing an infinite number of positions within the limiting range, that is, between full upright and full reclined positions. Typically, a manual control device is provided for releasing a lock, the passenger thereupon pushing against the seat back in order to cause it to move towards the full reclined position, releasing the manual control when the desired reclined position has been obtained. The adjusting mechanisms heretofore known have not only provided the above features, but have also in some instances provided a spring for urging the seat back to the full upright position.

The heretofore known mechanisms provided with a return spring have several deficiencies, however. Principally, these deficiencies include inflicting discomfort to the passenger by virtue of the spring returning the seat back to the upright position with such force that the passenger is "back slapped". Another deficiency of the prior known adjustment mechanisms has been the lack of any adjustability of the range of movement of the pivoted seat back.

Another important consideration in the provision of a mechanism of this general type has been that passengers have often left their seats with the seat in the reclined position, thereby obstructing the passage of passengers occupying seats in the row rearwardly thereof. It was thereupon the function of attendants, such as stewardesses, to restore the seat to the upright position, and this could only be done in earlier constructions, by having the attendant actuate the manual control in order to release the locking means and to thereby permit movement of the seat back; however, it has been proposed to provide a mechanism which enables the locking means to be released upon the application of a force to the seat back to restore it to upright position, the seat back thereupon being permitted to be moved to the desired upright position without actuation of the manual control. In a disclosed mechanism of this type, however, it was necessary to provide a separate actuating means or control means for the locking means, which separate actuating or control means was connected to the seat back through a lost motion connection. Such mechanism was somewhat complex, due to the requirement that there be a separate control means.

Control mechanisms which have heretofore been provided were of either the hydraulic type, or the mechanical type. The hydraulic type included a hydraulic piston and cylinder, and sealing was necessary, and obtained through the use of seals of elastomeric material. These seals are known to have a limited life, after which they are subject to leakage, with resultant defectiveness in operation of the mechanism. Also, it has been found that the typical movement of the piston rod in the seals results in the carrying on the surface of the piston rod a thin film of oil, which is subject to evaporation; as a consequence after a period of use, even without failure or deterioration of the seals, there is a decrease in the hydraulic oil or fluid contained in the device, with consequent loss of operating effectiveness.

SUMMARY OF THE INVENTION

The present invention provides a mechanism permitting the adjustment of relatively movable parts, particularly the seat bottom and seat back of a recliner type seat. This mechanism is substantially entirely mechanical, except for a pneumatic cylinder, thereby avoiding the deficiencies of hydraulic type mechanisms of this general nature. The present mechanism is capable of locking the parts in an infinite number of positions, within the range of movement of the parts, and that range itself is capable of adjustment. The mechanism herein disclosed provides locking means for two relatively movable parts or elements, which locking means is subject to being unlocked or released by a manual control, so that these elements may be moved relative to each other in either direction inside the movement range. Further, the present invention mechanism provides for an override to release the lock to permit relative movement in one direction, in response to a force applied in that direction to one of the elements, thereby both permitting the pushing or pulling on a seat back to return it to upright position and accomplishing this through a force applied to the movable element directly, thus avoiding the necessity of a separate control for the lock means. A further and important feature of the present invention is the provision of means to limit the velocity of movement of the movable element when the lock is released, to thereby avoid "back slapping" of the passenger where the mechanism is used in connection with recliner seating. In addition, and significantly, the present invention provides for adjustment of the range of movement of the movable element forming a part of the mechanism.

The mechanism includes a housing which is attached to for example a seat or seat bottom frame, and a slide bar of preferably rectangular cross section which is attached to the seat back or seat back frame. A ramp having inclined surfaces diverging from a center line overlies the slide bar; two rollers are provided, each being between a free surface of the slide bar and an inclined surfaces of the ramp. These rollers are urged into the triangular space thus provided by a spring, with consequent locking of the slide bar against movement in either direction. A release cam is provided capable of moving transversely of the slide bar and engaging the rollers, to cause them to move outwardly to thereby release the slide bar for movement in either direction, the release cam itself being operable by manual control means which may take either of several disclosed forms. To provide for override of the above described locking device including the double-inclined ramp and dual rollers, the ramp is pivoted laterally of the center line, and on the opposite side of the center line there is provided a roller stop in the inclined ramp surface. A ramp spring, preferably adjustable, urges the ramp about its pivotal connection towards the slide bar, and pivotal movement of the ramp itself is limited by appropriate stops. As a consequence, a force applied to the slide bar to move it in a direction so that that roller which is adjacent the roller stop is caused to engage that stop will result in a limiting of the forces acting to prevent such movement of the slide bar and the slide bar will thereby move in the direction of the applied force because the applied force tending to cause its movement is greater than the reaction force due to the roller which would normally prevent such movement.

The ramp is further provided with a pair of additional ramp surfaces which lie more remotely from the ramp center line and are at a steeper angle, relative to the slide bar, than the first mentioned ramp surfaces. A pneumatic piston and cylinder assembly is provided, the cylinder carrying a pair of wedge surfaces which are positioned for engaging one or the other of the remote ramp surfaces, or neither of them. The piston of the pneumatic cylinder has a hollow piston rod with adjustable control means in the form of a needle valve for controlling the flow of air into and out of the cylinder chamber. The piston rod also carries a gear which is in mesh with a rack in the mechanism housing and which is also in mesh with a rack formed on the slide bar, and a spring engages an end of the housing and the end of the piston rod. Therefore, the piston rod will move in the same direction as the slide bar, but for only half the distance of movement thereof; in addition, an increase or decrease of the pressure within the cylinder due to movement of the piston will cause the cylinder to have a limited movement, but sufficient to engage one or the other of the wedge surfaces with one or the other of the remote ramp surfaces. The wedges, or whichever of them is engaged, provides a force on the slide bar which is in opposition to, but less than the force causing the slide bar to move, with the result that there is a braking of the velocity of the slide bar to such an extent that the velocity of movement of the slide bar, and the seat back to which it may be connected, is limited. This prevents the above noted "back slapping".

The slide bar itself is additionally provided with a guide element which extends laterally of the axis of the slide bar, which guide element moves in a way provided between two apertured plates; pins may be placed between selected apertures, to thereby provide for adjustment of the range of movement of the slide bar, and therefore the seat back.

Other advantages of the present mechanism will become apparent from the following description, when taken in conjunction with the attached drawings.

DESCRIPTION OF THE PREFERRED EMBODIMENTS

Figure 1:
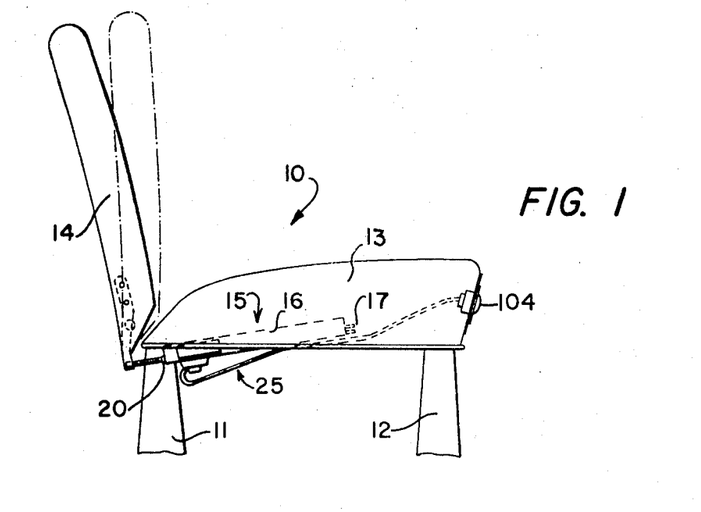
FIG. 1 is an elevational view of a recliner seat with the present mechanism applied thereto.

Referring now to the drawings, wherein like or corresponding reference numerals are used to designate like or corresponding parts throughout the several views, there is shown in FIG. 1 a recliner-type seat generally designated 10, and which may be any one of such seats as presently used on aircraft and busses. The seat 10 includes legs 11 and 12, a seat bottom 13 and a pivoted recliner back 14. The adjustment mechanism is generally designated 15, and generally includes a housing 16 which is pivotally attached at 17 to the seat bottom 18 or to the frame which supports it, the mechanism 15 further including a slide bar 20 which is pivotally connected at its free end to the lower end of the pivoted seat back 14. It is to be understood that the showing hereinabove described is illustrative, and that the attachment of the mechanism 15 may be to a seat formed other than seat 10, may be attached in other ways to an appropriate seat, or may also be attached to other structure than a recliner seat. A control means generally designated 25 has one end positioned towards the front of the seat 10 for ready manual actuation by an occupant of the seat, the other end of the control 25 being connected with the mechanism 15.

Figure 2:
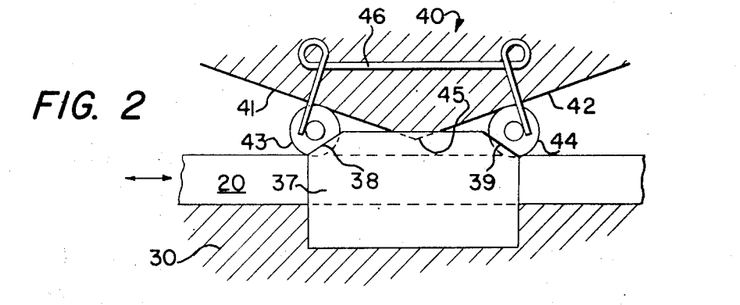
FIG. 2 is an elevational view of parts illustrating the basis of the present mechanism, in part.

In order to provide a disclosure of the basic principal of the present invention mechanism, there is shown in FIG. 2 a slide bar 20 and a fixed element 30 with which the slide bar 20 is in engagement, and on which the slide bar 20 may be moved, either to the left or right as shown in FIG. 2. Above slide bar 20, which is preferably of rectangular cross section, is a ramp 40 having a first inclined surface 41 and a second inclined surface 42, diverging from an apex 45. There are thereby provided two generally triangular spaces between the ramp surfaces 41 and 42 and the upper surface of slide bar 20. In each of the triangular spaces thus provided there are rollers 43 and 44; a formed wire spring 46 urges the rollers 43 and 44 inwardly into the triangular spaces, towards the apex 45, spring 46 acting on lateral extensions of the rollers. Assuming that the ramp 40 is fixed relative to the element 30, a force applied to the slide bar 20 to move it towards the left will cause the roller 44 to attempt to roll deeper into the triangular space to which it is located, towards the apex 45, but since the roller 44 cannot move in that direction there will be a reaction force at the point where roller 44 contacts the upper surface of slide bar 20, which force will be normal to the slide bar 20, thereby forcing it against the upper surface of element 30. Taking into account a selected angle for the surface 42 relative to the upper surface of slide bar 20 and the maximum static coefficient of friction between roller 44 and slide bar 20, there will result a restraining force against movement of the slide bar 20 to the left which is larger than the force urging slide bar 20 to the left. As a result, the slide bar 20 will not be able to move to the left. As will be apparent, the same considerations apply in the case of a force applied to move the slide bar 20 to the right, in which case the roller 43 and ramp surface 41 will act in the same manner.

The apparatus thus far described will be seen to prevent movement of the slide bar 20 in either direction, equally well, and it is apparent that spring 46 serves only to keep the rollers 43 and 44 engaged with their surfaces, thereby preventing backlash, the locking effect above produced is self-energizing, and is not dependent upon the spring.

In order to provide for movement of the slide bar 20, a relase cam 37 is provided for moving the roller 43 and 44 to a released or unlocked position. Release cam 37 may be moved transversely of slide bar 20, and is provided with a pair of roller-engaging inclined surfaces 38 and 39. Consequently, movement of the release cam 37 in the upper direction will effect displacement of rollers 43 and 44 away from each other and from the apex 45, so that when a force is applied to move the slide bar 20 in either direction, there will be no restraint or locking of slide bar 20 due to the rollers 43 and 44 and the ramp surfaces 41 and 42, respectively.

Figure 3:
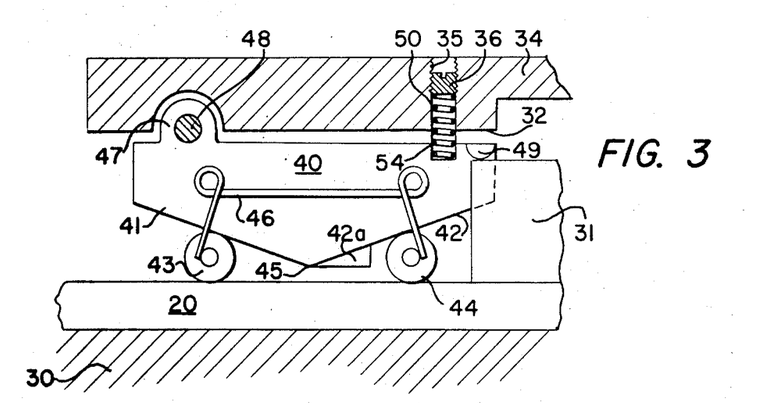
FIG. 3 is a view similar to FIG. 2, but with modifications to provide for one-way override.

Referring now to FIG. 3, the entire ramp 40 may be seen, including an ear 47 extending from the surface opposite the apex 45, ear 47 being provided with an aperture receiving a pivot pin 48. Adjacent the apex 45 there is provided a roller stop 42a on the inclined surface 42 of the ramp 40. Further, a stop finger 49 extends laterally from the ramp 40 at the right hand end thereof, and lies between a lower ramp stop 31 and an upper ramp stop 32. Stop 31 may be formed as a part of an integral extension of the element 30, and stop 32 may be formed as a part of a plate 34, which is fixed relative to the element 30 and may, in fact, be integral or secured thereto. The plate 34 is provided with a threaded opening 35 having a screw 36 therein, a ramp spring 50 extending in the bore 35 from the bottom surface of screw 36 into a recess 54 in the ramp 40.

In operation, the ramp spring 50 will provide a clockwise force on ramp 40, about pivot pin 48, and cause stop finger 49 to engage with lower ramp stop 31. It a force is applied to slide bar 20 to move it towards the right, the ramp 40 will pivot in a counter clockwise direction until the stop finger 49 engages the upper ramp stop 32, when the same locking action will occur in connection with roller 43, ramp surface 41 and slide bar 20 as was mentioned above in connection with FIG. 2. In contrast, however, should a force be applied to slide bar 20 to move it towards the left, roller 44 will be acted on by slide bar 20 and in turn will act on ramp 40 so as to move the stop finger 49 towards upper ramp stop 32, but will not engage it, due to the fact that roller 44 will engage roller stop 42a, thereby preventing further movement of roller 44 to the left. Consequently, roller 44 can no longer tend to roll deeper into the triangular space in which it is located, so that the self-energizing action which is present in connection with roller 43 is no longer present in connection with roller 44. As a result, increasing the force applied to slide bar 20 to move it to the left produces no consequent reaction of the locking force urging the roller 44 against slide bar 20 and slide bar 20 in turn against the element 30 and consequently slide bar 20 will be permitted to move to the left by the noted force applied directly to it. As a consequence, the mechanism disclosed in FIG. 3 permits an override of the locking system when the slide bar 20 is moved to the left, but not when slide bar 20 is moved to the right. In order to permit slide bar 20 to move to the right, means must be provided for moving roller 43 away from apex 45, such as the release cam 37 shown in FIG. 2.

Depending upon the materials used, and therefore their coefficients of friction, and also dependent upon the angles of the surfaces 41 and 42, and assuming these to be fixed, as in a working mechanism, the actual force required to be applied to slide bar 20 to move it to the left will be dependent upon the adjustment of ramp spring 50 by the adjustment screw 36. Adjustment of the screw 36 to an outer position will result in a lesser force by spring 50 on ramp 40, so that a relatively small force tending to move slide bar 20 to the left will be sufficient to effect an override, while adjustment of the screw 36 inwardly will have the opposite effect. Should the screw 36 be advanced into the bore 35 to effect a "stacked solid" condition of ramp spring 50, it will be seen that the stop finger 49 will engage the lower ramp stop 31 and will be prevented from moving away from it. Thus, this adjustment of adjustment 36 will prevent pivoting the ramp 40 about pivot pin 48 and the noted override capability of the mechanism will have been eliminated. In such instances, movement of the slide bar 20 can be effected only with a release means such as the release cam 37 shown in FIG. 2. As a consequence of the mechanism as disclosed in FIG. 3, override will be permitted, the adjustment of the necessary override force can be made, and, alternatively, the override feature can be selectively eliminated.

Figure 4:
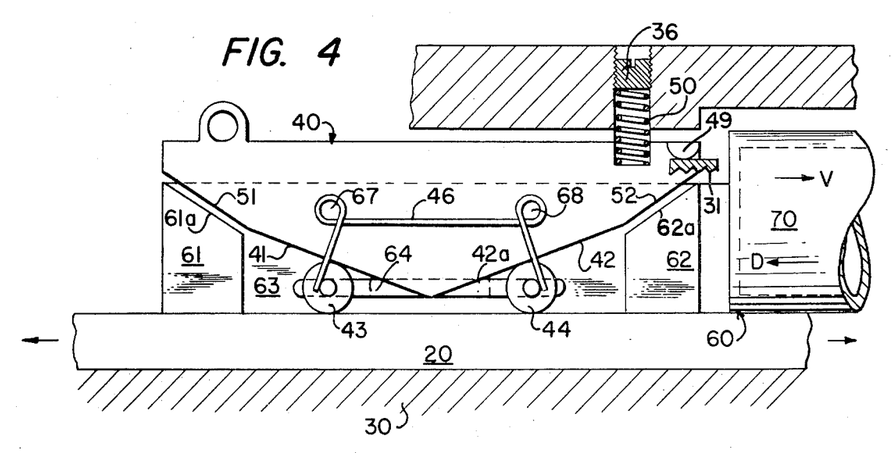
FIG. 4 is a further amplification of the apparatus illustrated in FIGS. 2 and 3, and directed to the speed control feature.

Referring now to FIG. 4, there is shown a mechanism generally similar to that of FIG. 3, but with the following additional structural features. The ramp 40 is provided with a pair of outer ramp surfaces 51 and 52, lying respectively outwardly of the aforementioned ramp surfaces 41 and 42. A wedge-cylinder 60 carries a pair of wedges 61 and 62, wedge 61 being provided with an inclined surface 61a having approximately the same inclination as surface 51, and wedge 62 carrying a wedge surface 62a having approximately the same inclination as ramp surface 52. The wedges 61 and 62 are carried by an extension plate 63 that lies rearwardly of the ramp 40, and the wedges 61 and 62 may be integral therewith. A slot 64 extends in extension plate 63, and receives axial extensions of rollers 43 and 44, to guide them in their movement. Extension plate 63 is connected to or integral with a pneumatic cylinder 70, which may have a force applied to it to move it towards the right. As is clearly shown in FIG. 4, the wedges 61 and 62 are spaced a sufficient distance apart so that the surfaces 61a and 62a thereof may both be out of contact at the same time with the outer ramp surfaces 51 and 52 with which they may cooperate. This centering action results from spring 46, which is supported on projections 67 and 68 extending from an extension plate (not shown in FIG. 4) which is parallel to extension plate 63 and also connected to cylinder 70. Hence spring 46 centers wedges 61 and 62 out of contact with ramp surfaces 51 and 52.

In operation, assume that slide bar 20 is moving towards the left, and that a force has been applied to the pneumatic cylinder so as to cause it, also, to move to the left. As a result of the movement of the pneumatic cylinder 70 to the left, the entire wedge-cylinder component 60 will move to the left, so that the surface 62a of wedge block 62 will engage the outer ramp surface 52, and there will result a force on the upper surface of the slide bar 20, caused by the noted engagement of wedge block surface 62a and outer ramp surface 52, and force being applied by the lower surface of the wedge block 62. This force will tend to restrain the movement of the slide bar 20, and therefore in effect will produce a restraining force which is opposite in direction to the force moving the slide bar 20 to the left. By giving consideration to the materials used and the coefficients of dynamic friction thereof, and taking into consideration the angle of the outer ramp surface 52 and wedge surface 62a, the restraining force on slide bar 20 can be selected so as to be considerably larger than the force acting on the pneumatic cylinder 70 which tended to move the entire wedge-cylinder component 60 to the left. However, this resulting restraining force will not be so large as to generate a self-locking effect, such as that described hereinabove with relation to the rollers 43 and 44. In effect, the outer ramp surface 52 and wedge block surface 62a serve to amplify the force applied to pneumatic cylinder 70 to generate a larger restraining force which opposes the motion of slide bar 20 in its movement to the left.

As will be readily understood, if a force is applied to slide bar 20 to move it to the right, and a force is applied to the wedge-cylinder 60 to move it, also, to the right, there will be amplification of the force on wedge cylinder 60 through the engagement of wedge block 61 with ramp 40, specifically outer ramp surface 51 thereof, and there will also be produced thereby a restraining force on the slide bar 20. In both cases, therefore, there will result a net force on the slide bar 20 which will be in the opposite direction as the force applied to it, but of a lesser magnitude. Hence, the force tending to move the slide bar 20 will have been significantly reduced, to thereby reduce its velocity. Consequently, where the slide bar 20 is connected to a seat back, so that the slide bar 20 is moving, for example, to the left, and the seat back is moving to the upright position, the velocity of the slide bar 20 and the seat back to which it is connected will be restrained and there will thereby be avoided the above-mentioned "back-slapping".

Figure 5:
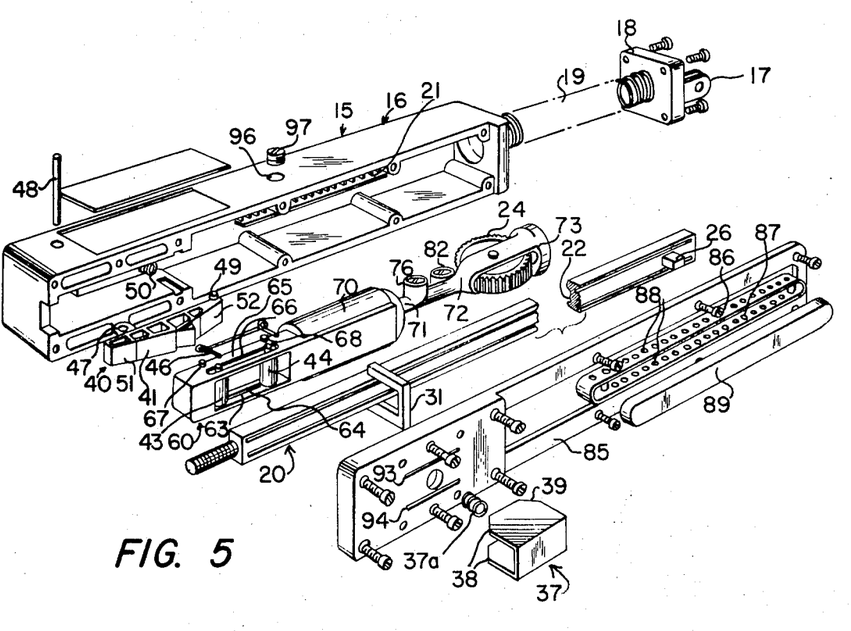
FIG. 5 is an exploded view of the preferred embodiment of the present invention mechanism.

Referring now to FIG. 5, there may be seen an exploded, perspective view of a preferred embodiment of a mechanism in accordance with the present invention. Thus, the housing 16 is shown, being generally hollow and having an end cap 18 for providing the pivotal connection 17 shown on FIG. 1. In order to accommodate the adjustment mechanism 15 to various seat constructions, it is contemplated that the end cap 18 may conveniently take different forms, thereby avoiding any necessity to change the other structure of the mechanism 15. Abutting the end cap 18 (see also FIG. 6) is a slide bar actuating spring 19. Housing 16 also includes a rack 21. The slide bar 20, as best seen in FIG. 6 also is provided with a rack, 22, the rack 21 of the housing and the rack 22 of the slide bar 20 being in parallel, spaced and opposed relationship, with a gear 24 engaging and in mesh with both of the racks 21 and 22.

As is apparent from FIG. 5, the gear 24 is carried in a yoke 72 which is preferably integral with a piston rod 71, yoke 72 having at its rear or right end a seat 73 for the spring 19.

Figure 6:
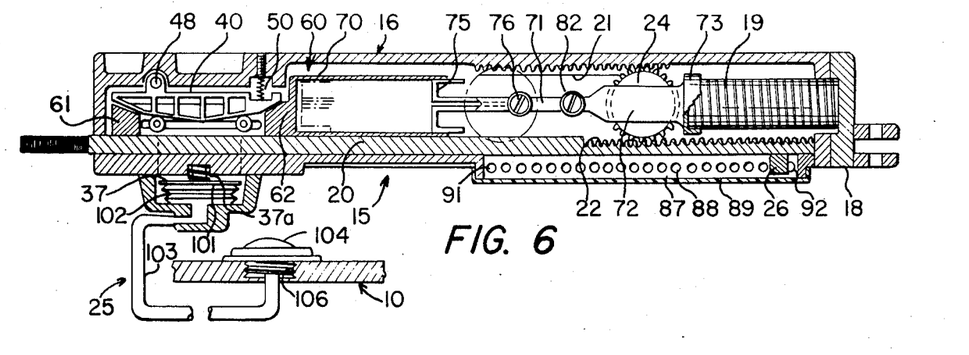
FIG. 6 is a longitudinal cross sectional view through the mechanism illustrated in FIG. 5.

Referring now to FIG. 6, the piston rod 71 may be seen to extend to the left of the yoke 72, and to terminate in a piston 75. Piston 75 is within a pneumatic cylinder 70: pneumatic cylinder 70 forms a part of an integral unit previously referred to, the wedge cylinder 60. Thus in FIG. 5, there may be seen the extension plate 63, extending to the left of the pneumatic cylinder 70, and in spaced parallel relation thereto is a similar extension plate 65, the latter having a guide slot 66, and the former having a guide slot 64: in these guide slots are axial extensions of the rollers 43 and 44. Extension plate 65 is provided with a pair of outstanding cylindrical projections 67 and 68 which provide a mounting support for the spring 46.

The housing 16, which is basically channel-shaped in cross section, is provided with a bottom closure plate generally designated 85, and includes a pair of spaced parallel plates 86 and 87 having aligned apertures 88 therein, the plates 86 and 87 together define a way: a closure cover 89 is preferably provided for the plates 86 and 87. Movable in the way provided by the plates 86 and 87 is a downwardly directed extension 26 of the slide bar 20, and as best shown in FIG. 6, a pair of pins may be selectively positioned in any pair of aligned apertures 88 in the plates 86 and 87 to thereby provide for selective limiting of the range of movement of the slide bar 20.

Toward its left end, and underlying the ramp 40, the bottom closure plate 85 is provided with a pair of longitudinally extending slots 93 and 94 which receive the release cam 37. Release cam 37 is in the form of a channel, the two arms of which extend into the slots 93 and 94 and the roller-engaging inclined surfaces 38 and 39 thereof are provided on the two portions of the release cam 37 formed by the channels thereof. Thus, the surfaces 38 and 39 on both arms of portions of the release cam 37 engage axial extensions of the rollers 43 and 44 on the outer sides of both of the extension plates 63 and 65. A release cam return spring 37a is also provided, engaging the bottom closure plate 85 of housing 16.

There may also be seen in FIG. 5 a U-shaped element 31, this being the above referenced stop for the ramp 40, and there may be also seen the pivot pin 48 which extends through the side walls of the housing 16 and also through the ear 47 of ramp 40. There is also provided an opening 96 with closure plug 97 in one wall of the housing 16, to provide access to the interior thereof, specifically to a control screw 76.

Referring now to FIG. 6, the hereinabove described parts may be seen in assembled relationship, there being clearly shown the spring 19, gear 24 in mesh with racks 21 and 22, the piston rod 71 integral with the piston 75 in the pneumatic cylinder 70, and the organization of the wedge-cylinder 60, the latter including the wedges or wedge blocks 61 and 62. There may also be seen the ramp 40 with the pivot pin 48 and ramp spring 50.

Figure 7:
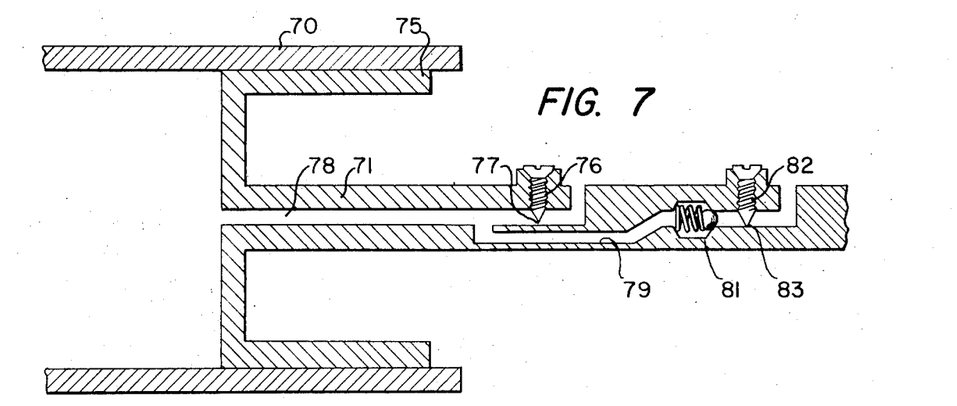
FIG. 7 is an enlargement of a part of piston rod forming a part of the mechanism shown in FIGS. 5 and 6.

Referring now to FIG. 7, there is shown on an enlarged scale the piston 75 with piston rod 71, the piston rod 71 being provided with the above mentioned control screw 76 having integral with it a needle valve 77, which thereby provides for adjustable control of the flow of air through a passage 78 extending in the piston rod 71, and communicating with the atmosphere within the housing 16, and with the interior of the pneumatic cylinder 70. In addition a branch passage 79 is provided having a check valve 81 therein to permit passage of air into the interior of the pneumatic cylinder 70, but preventing air from flowing from the interior of pneumatic cylinder 70 to the atmosphere. In series with the check valve 81 is a control screw 82 having a needle valve 83 for adjustably controlling the rate of flow of air into the pneumatic cylinder 70 through the branch passage 79.

The operation of the apparatus as specifically disclosed in FIGS. 5, 6 and 7 will be described, bearing in mind the hereinabove provided descriptions of the operations given in connection with FIGS. 2, 3 and 4.

More particularly, in connection with the description of the operation of FIG. 4, reference was made to forces applied to the pneumatic cylinder 70. The force causing the wedge cylinder 60, including pneumatic cylinder 70, to move to the left will be generated by the compression of air within the pneumatic cylinder 70 when the piston 75 is moved to the left, and piston 75 is moved to the left when the slide bar 20 is moved to the left, this being the motion which occurs when the seat back 14 is being returned to the upright position. The movement of the piston 75 into the cylinder 70 compressed the air within the cylinder 70 increasing the pressure therein. There is provision for escape of the air from within pneumatic cylinder 70, this occurring past the control screw 76 with needle valve 77 thereon. Hence, the adjustment of control screw 76 serves to determine the rate of pressure accumulation within the pneumatic cylinder 70 for a given velocity of movement of the slide bar 20 to the left, it being understood that this movement is generated by the spring 19 upon movement of the release cam 37. The control of the rate of pressure accumulation within the pneumatic cylinder 70 in effect controls the above mentioned force which is applied to the wedge cylinder 60, to thereby engage wedge block 62 with the ramp surface 52. The wedge 62 and ramp 40 thereby act to produce the above mentioned amplified restraining force on slide bar 20 to provide for control of its velocity. Obviously, the magnitude of the restraining force and therefore the velocity of the slide bar 20 can be adjustably controlled by adjustment of the control screw 76, for movement of slide bar 20 to the left, and seat back 14 towards upright position.

It is to be further noted that the rate of pressure accumulation within the pneumatic cylinder 70, for given slide bar velocity, is related to the instantaneous volume within the pneumatic cylinder 70. This volume, of course, reduces as the piston 75 advances to the left and the rate of pressure accumulation concurrently increases. As a result, the herein provided apparatus serves to increase the instantaneous pressure-to-slide bar-velocity relationship as the piston 75 moves to the left and this causes lower velocities of slide bar 20 as it moves towards the end of its travel, towards the left, as determined by the pin 91. That is, at the end of the movement of the slide bar 20 approaching the seat upright position, there is a greater restraining force on slide bar 20, and thereby a lower velocity of it. This causes the seat back to arrive at the upright position with a gentle or soft stop, thereby preventing the "back slapping" above noted.

For movement of the slide bar 20 to the right, the gear 24, yoke 72 and piston 75 will move to the right, thereby diminishing the pressure within the pneumatic cylinder 70. This generates a force on the wedge cylinder 60 causing it to move to the right, to thereby cause engagement of the wedge 61, and the amplification of a restraining force to the movement of slide bar 20. If the control screw 82 is moved to a position where essentially the needle valve 83 does not function to restrict passage of air into the pneumatic cylinder 70, the above described rate of pressure accumulation will be much lower: that is, because the air flow into the pneumatic cylinder will be substantially unrestricted, the force acting to move the wedge cylinder 60 to the right will be relatively low, and therefore the restraining force applied to the slide bar 20 will be relatively low.

Thus, with the above noted adjustment of the control screws 76 and 82, the movement of the seat back 14 towards the upright position will be with an ever diminishing velocity, because of the restricted communication with atmosphere through the needle valve 77 and the blockage of communication through branch passage 79 by check valve 81, while in movement of the seat back towards the reclined position, there would be the above noted substantially unrestricted flow into the pneumatic cylinder 70 with a comparatively small restraining force on the slide bar 20. Thus, in movement towards seat reclining position, the retarding force will be comparatively low. As will be understood, however, in some applications, it would be desired to provide a control for movement of slide bar 20 to the right, and this can be achieved by adjustment of the control screw 82 to provide for restricted flow into the pneumatic cylinder 70. It is further noted that movement by the passenger of the seat back towards the reclined position is against the force of the spring 19, so that there is in fact some resistance to movement of the slide bar 20 to the right, due to the spring 19.

Further, it will be seen that the wedge cylinder 60 is normally in position where neither of the wedges 61 or 62 engages the juxtaposed ramp surfaces 51 and 52, respectively. Thus, it is in a centered or floating condition, due to the noted action of spring 46 on projections 67 and 68 of extension plate 65, and the control force, in either direction, is basically proportional to the velocity of slide bar 20, and the force on slide bar 20 will be amplified by the cooperation of wedge block 61 or 62 and ramp 40 as described.

The control means 25, generally shown in FIG. 6 includes a piston 101, which is preferably a part of a bellows 102. Bellows 102 is fluid connected with a conduit 103 which extends to a convenient portion of the seat 10, where there is a second piston 104 connected to bellows 106. Thus pushing on the piston 104 will cause liquid to flow from bellows 106 through conduit 103 and into bellows 102, to thereby move piston 101 and, with it, cam 37. Spring 37a will return the parts to the position shown, upon release of piston 104.

Figure 8:
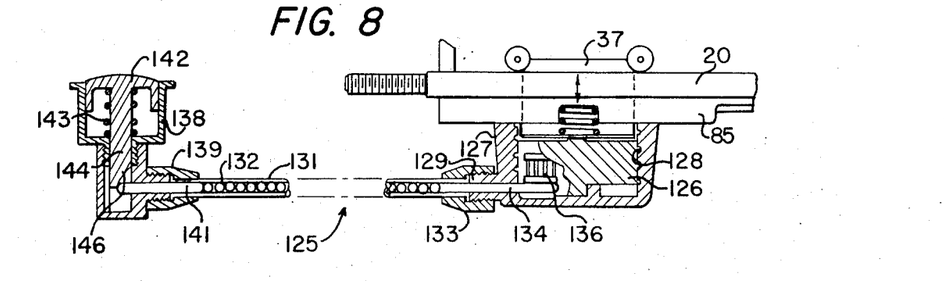
FIG. 8 is a cross sectional view showing an alternate control for the present mechanism.

In FIG. 8 there is an alternate control, generally designated 125. A screw 126 is carried in a housing 127, which is provided with internal threads 128. A tangentially extending nipple 129 has secured to it a conduit 131, in which are a series of balls 132 which are in contact with each other. A connector 133 serves to connect the conduit 131 with the nipple 129, and there is provided therein a rod 134 which is adapted to translate axially. The screw 126 is provided with a radially extending finger (not shown) near its bottom, which is engaged by rod 134, and a suitable spring 136 has one end connected with the screw 126 for causing it to move, rotationally, in one direction.

At the other end of the conduit 131 there is a housing 138 with a connector element 139 having a second rod 141 therein. Within the housing 138 is an actuator element 142, urged upwardly by the spring 143 and having a control post 144 with cam surface 146, engaged by the end of the rod 141. Upon depressing of the actuator 142, the rod 141 will be caused to move to the right, moving with it the balls 132 which cause the rod 134 to move to the right, rotating the screw 126, and causing it to advance axially, to move the control cam 37 to the release position. Upon release of force from actuator 142, it will be returned by spring 143, and the spring 136 will cause rotation of the screw 126 in the opposite direction, thereby pushing against the right hand end of the rod 134, causing the balls 132 to move to the left, and to move, also, the rod 141 to the left.

It will be obvious to those skilled in the art that various changes may be made without departing from the spirit of the invention and therefore the invention is not limited to what is shown in the drawings and described in the specification but only as indicated in the appended claims.

I claim:

1. An adjustment mechanism for use with recliner seats comprising:
   a first element, a second element in frictional engagement with said first element and movable relative thereto in opposite directions,
   means for releasably locking said second element against movement in a first direction relative to said first element, said releasable locking means comprising means responsive to a force of predetermined magnitude applied in one direction to said second element for releasing said locking means, and
   control means for moving said locking means to a release position to permit relative movement of said elements.

2. The adjustment mechanism of claim 1, and further comprising means for urging said second element in one said direction, and means for retarding the movement of said second element in said one direction.

3. The adjustment mechanism of claim 2, and means operatively connected to said second element for movement therewith for adjusting said retarding means.

4. The adjustment mechanism of claim 1, wherein said second element is a slide bar, and said locking means comprises a ramp having a pair of oppositely inclined surfaces adjacent said slide bar opposite said first element and a roller between said slide bar and each said inclined ramp surface.

5. The adjustment mechanism of claim 4, wherein said control means comprises means for moving each said roller to a position wherein it engages at most one of the slide bar and adjacent inclined ramp surfaces.

6. The adjustment mechanism of claim 4, means for supporting said ramp for movement toward and away from said slide bar, spring means urging said ramp toward said slide bar, and roller stop means for limiting the extent of movement of one said roller in a slide bar locking direction.

7. The adjustment mechanism of claim 6, said spring means comprising a spring and adjustable pre-loading means therefor.

8. The adjustment mechanism of claim 7, wherein said spring is a coil spring and said adjustable pre-loading means comprises means for stacking solid said coil spring.

9. The adjustment mechanism of claim 4, and further comprising spring means for urging said slide bar in one direction, and means for retarding the movement of said slide bar in said one direction.

10. The adjustment mechanism of claim 9, said last mentioned means comprising an additional inclined surface of said ramp, a wedge block in engagement with said slide bar opposite said first element, said wedge block having an inclined surface in justaposition with said additional inclined surface of said ramp, and means for engaging said wedge block and the ramp surface in juxtaposition therewith concurrently with movement of said slide bar in said one direction.

11. The adjustment mechanism of claim 10, wherein said ramp comprises a second additional inclined surface inclined oppositely to said first mentioned additional inclined surface, a second wedge block in engagement with said slide bar opposite said first element and having an inclined surface in juxtaposition with said second additional inclined surface, and means for engaging said second wedge block and the ramp surface in juxtaposition therewith concurrently with movement of said slide bar opposite said one direction.

12. The adjustment mechanism of claim 11, said last mentioned means comprising a pneumatic clyinder connected to said second wedge block.

13. The adjustment mechanism of claim 10, said last mentioned means comprising a pneumatic cylinder connected to said wedge block.

14. The adjustment mechanism of claim 1, wherein said second element is a slide bar, and further comprising spring means, and means connecting said spring means to said slide bar.

15. The adjustment mechanism of claim 14, said first element comprising a housing, said connecting means comprising rack means on said slide bar and on said housing, a gear in mesh with said rack means, and means connecting said spring means with said gear.

16. The adjustment mechanism of claim 14, and further including means for retarding movement of said slide bar, and means responsive to movement of said slide bar for actuating said movement retarding means.

17. The adjustment mechanism of claim 16, said movement retarding means comprising wedge means engageable with said slide bar and a reaction member.

18. The adjustment mechanism of claim 16, said actuating means comprising pneumatic piston and cylinder means, means operatively connecting the piston to said slide bar, and means responsive to non-atmospheric pressure in said cylinder for moving said movement retarding means.

19. The adjustment mechanism of claim 18, said pneumatic piston and cylinder means comprising adjustable port means communicating said cylinder with atmosphere.

20. The adjustment mechanism of claim 18, wherein said pneumatic piston and cylinder means comprises separate means for controlling the rate of flow of air into and out of the cylinder of said piston and cylinder means.

21. The adjustment mechanism of claim 1, said control means comprising a release cam, and manually controlled means for moving said release cam.

22. The adjustment mechanism of claim 21, wherein said last mentioned means comprises a closed fluid system including a manually operable piston means, second piston means adjacent said release cam, and a conduit fluid connecting said piston means.

23. The adjustment mechanism of claim 21, said last mentioned means comprising a conduit having plural contacting spherical elements therein.

24. The adjustment mechanism of claim 1, and further comprising means for limiting the range of movement of said second element.

25. The adjustment mechanism of claim 24, said last mentioned means comprising a lateral extension on said second element, means defining a way for said extension, and adjustable blocking means extending from said way-defining means transversely of the path of movement of said lateral extension.

26. The adjustment mechanism of claim 25, said way-defining means comprising a pair of spaced, parallel plates having aligned apertures therein, said adjustable blocking means comprising pins positionable in selected ones of said aligned apertures.

27. A mechanism for releasably locking a pair of elements comprising:
   a. an axially movable slide bar,
   b. a fixed element having a surface engaged by a surface of said slide bar,
   c. reaction means comprising a ramp adjacent said slide bar opposite said fixed element, said ramp having a pair of ramp surfaces diverging from an apex adjacent said slide bar,
   d. a pair of rollers each between said slide bar and a said surface for acting against said reaction means and said slide bar, and,
   e. release means for moving at least one said roller in a direction away from said apex.

28. The mechanism of claim 27, means for supporting said ramp for movement toward and away from said slide bar, spring means urging said ramp toward said slide bar, and roller stop means for limiting the extent of movement of one said roller in a slide bar locking direction.

29. The mechanism of claim 27, and further comprising spring means for urging said slide bar in one direction, and means for retarding the movement of said slide bar in said one direction.

30. A mechanism for use with recliner seats comprising:
   a first element, a second element in engagement with said first element and movable relative thereto in opposite directions,
   means for releasably locking said second element,
   control means for said locking means,
   means for urging said second element in one direction and,
   means for retarding the movement of said second element in said one direction.

31. The mechanism of claim 30, and means operatively connected to said second element for movement therewith for actuating said retarding means.

32. The mechanism of claim 30, wherein said retarding means comprises means for retarding movement of said second element in either direction.

33. The mechanism of claim 30, said retarding means comprising means for applying a retarding force proportional to the velocity of said second element.

* * * * *